June 24, 1958  F. WHITWORTH  2,839,923
PRESSURE RELIEF MEANS FOR GAS METERS
Filed March 11, 1955
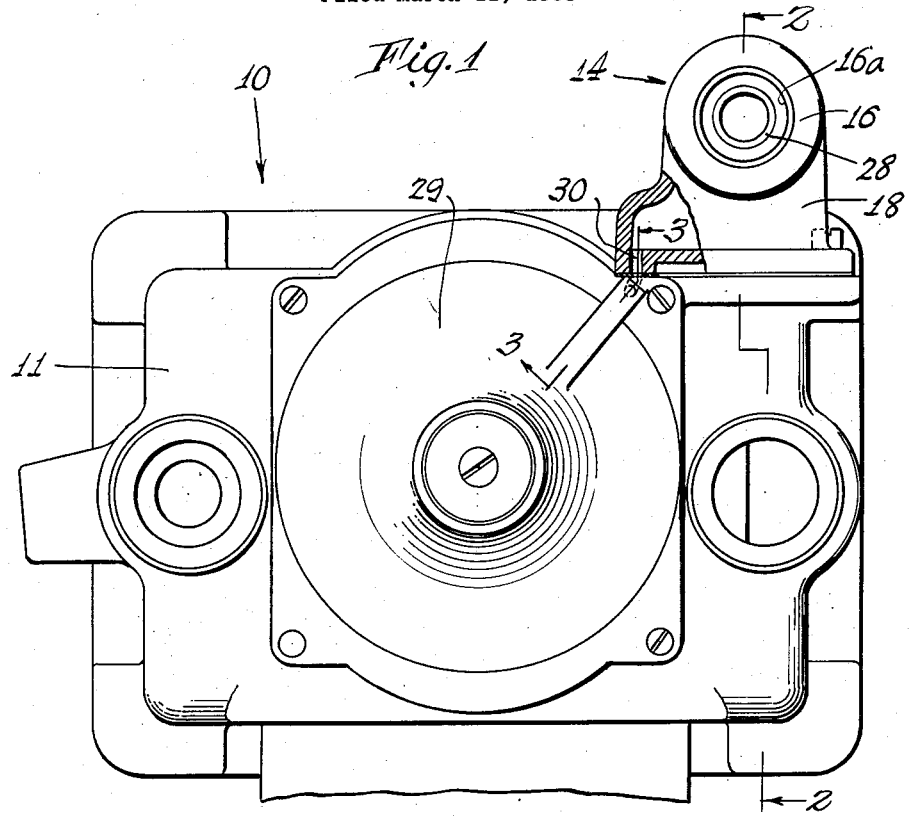
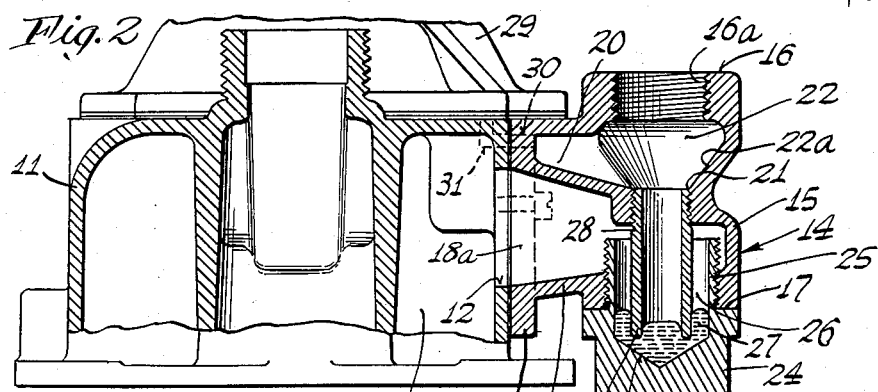
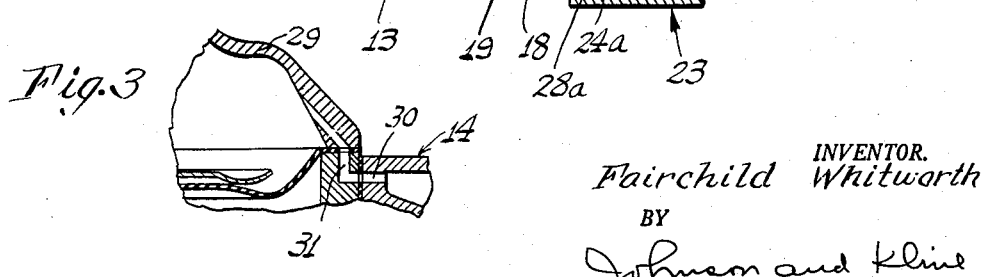
INVENTOR.
Fairchild Whitworth
BY
Johnson and Kline
ATTORNEYS

United States Patent Office 2,839,923
Patented June 24, 1958

2,839,923

PRESSURE RELIEF MEANS FOR GAS METERS

Fairchild Whitworth, Fairfield, Conn., assignor to The Sprague Meter Company, Bridgeport, Conn., a corporation of Connecticut Application March 11, 1955, Serial No. 493,665

1 Claim. (Cl. 73—199)

This invention relates to a pressure regulating device and more particularly a combined gas meter and pressure regulating device having a novel blow-off means therefor which is adapted to be detachably mounted on the housing portion of the device.

In pressure regulating devices such as a combined meter and pressure regulator, or a pressure regulator and the like, especially when used in a high pressure system, it is customary to provide a "blow-off" means therefor to relieve any excess pressure over and above a predetermined pressure which might be built up in the pressure chamber of the gas meter or regulating device due to any reason, as for example, sticking of the valve in open position because of dirt or other foreign matter.

Heretofore, blow-off means, which are generally in the form of a liquid seal having irregularly shaped chambers, have been formed as an integral part of the housing portion of a gas meter or regulating device. Since it is the practice to form these housing portions of a cast material, casting the liquid sealing or blow-off means integral therewith produced a relatively bulky and complex casting. A further disadvantage of this prior practice was that it was difficult to core the irregular chambers of the liquid seal blow-off means integral with the housing portion of a regulating device. Producing such integral complex castings, as was the prior practice, oftentimes resulted in waste because the core forming the chambers of the liquid sealing means would slip or move out of place relative to the main core, thereby causing the wall portions of the gas meter or regulating device to be formed with thin spots. Consequently, such defective housing portions had to be rejected. Because of such rejections, complexity and difficulty of casting the blow-off means with the housing of a gas meter and the like, the cost thereof was greatly increased.

A further disadvantage resulting from this prior practice was that, where it was desirable to use a gas meter or regulating device in which the incorporation of a blow-off means was not necessary, as in a low pressure system, a different housing with the omission of the blow-off portion had to be formed which required a separate and completely independent molding operation. Consequently this prior practice lead only to duplications of material, time and effort in forming the housing portion for a regulating device depending on whether the device was to be used with or without a blow-off means.

This invention overcomes the above disadvantages by providing a relatively simple and inexpensive blow-off means which is separately produced as an independent unit, and which is adapted to be readily attached or detached from the housing portion of a gas meter or pressure regulating device which may be utilized in a system either with or without the blow-off unit attached thereto.

A feature of this invention resides in the provision that a "blow-off" means is produced as a separate and relatively simple independent unit which may be attached to existing pressure regulating devices.

Another feature resides in the provision that the main housing of a gas meter or regulating device formed according to this invention can be used with or without the novel blow-off means attached thereto.

A further feature of this invention resides in the provision that the vent chamber of a combined gas meter, regulator, or pressure regulating device is vented through the novel blow-off attachment.

A still further feature of this invention resides in the provision that the novel blow-off means is readily repaired or replaced in the field without the need of disassembling or replacing the main housing portion of the regulating device.

Other features and advantages will be apparent from the specification and claim when considered with the drawings in which:

Figure 1 is a plan view of the top portion of a combined gas meter and pressure regulator having the novel liquid sealing means attached thereto.

Fig. 2 is a partial side elevational sectional view taken along line 2—2 of Fig. 1.

Fig. 3 is a fragmentary sectional view, partly broken away, taken along line 3—3 of Fig. 1.

Generally, a combined gas meter and pressure regulator, or a pressure regulator includes a housing portion having a diaphragm positioned therein to separate the housing into a pressure chamber and a vent chamber, the diaphragm being operatively connected to a valve means controlling the inlet thereto whereby the flow of gas through the regulator or regulating portion of the meter is controlled by the fluctuation of the diaphragm. Not infrequently the valve for some reason, as due to dirt, would stick in the open position allowing an excessive amount of pressure to be built up within the housing.

Since such regulating devices are employed in a system, as for example, a high pressure system, it was desirable for reasons of safety to provide such regulating devices with a relief or blow-off means so that any excessive pressure built up within the pressure chamber of the regulator or gas meter over and above a predetermined amount would be relieved through the blow-off means. Thus, any hazardous conditions created by a build-up of an excessive pressure therein is eliminated. Usually these blow-off means, as they are known in the art, are of the liquid-seal type.

According to the present invention, the blow-off means is formed as a separate and independent unit from that of the housing portion of the gas meter or regulating device whereby it may be readily attached or detached thereto so that a common housing may be formed and used either with or without the novel blow-off means to be herein described. As a result, the need for separate castings for forming a housing for use in a system in which a blow-off means was not required is eliminated.

While this invention may be equally well adapted in practice to a pressure regulator, it is herein illustrated and described with reference to a combined gas meter and pressure regulator 10. According to this invention, the top portion 11 of the gas meter housing is formed, preferably by casting, with an opening 12 in the wall portion thereof. This opening 12 is positioned in the wall portion of the housing so as to be in communication with the pressure chamber 13 of the regulating portion of the gas meter which is in all other respects shaped in a manner well known in the art. Therefore, if the combined gas meter and pressure regulator 10 is to be utilized in a system wherein the need for a "blow-off" is unnecessary, the opening 12 may be covered by a simple plate member (not shown). If, however, it is desirable that the combined meter and regulator, according to this invention, be utilized in a system requiring the need of a blow-off, a novel "blow-off" means 14 to be herein described may be readily attached thereto upon removal of the cover plate. If desired, in existing meters an aperture may be readily formed in a wall portion so as to communicate with the pressure chamber thereof by suitable means so that the novel blow-off means of this invention may be attached thereto.

According to this invention the novel blow-off means is formed as a separate and independent unit comprising a body member 14 which is relatively simple in construction and which is adapted to be detachably mounted to the top housing portion 11 of a combined gas meter and pressure regulator. While the body member 14 need not conform to any particular size or shape, and may be formed by any well-known means, the body member of the illustrated embodiment is formed by simple casting.

As illustrated in Fig. 2, the body member 14 is in the form of a T-shaped fixture having the cross-arm portion 15 thereof provided with open ends 16 and 17 and a hollow stem portion 18 having a mounting flange 19 on the end thereof. The flange 19 is formed so that it may be readily attached to the housing so that the opening 12 therein is in communciation with the stem. Suitable fastening means, such as a bolt or the like, secure the body member to the housing. The opening 12 may be closed by a cover plate (not shown) whenever the blow-off means is not required to be part of the system.

The crossarm portion 15 of the body is provided with a partition 20 having an aperture 21 therein, the partition being disposed intermediate the open ends 16 and 17 of the crossarm dividing the same into an upper and lower portion. The upper portion of the crossarm forms an upper chamber 22 which is adapted to be connected to the atmosphere. If desired, the open end 16 may be provided with interior threads 16a for receiving a threaded vent pipe extension (not shown).

The other open end 17 of the crossarm 15 is closed by a cup-shaped member 23 having a bottom wall 24 and a projecting wall portion 25 extending a substantial distance into the interior of the body and forming therein a second or lower chamber 26. While the cup member 23 may be connected to the body member by any suitable means, the wall portions 25 are provided with exterior threads which engage the interior threads of the opening 17. As shown, the bottom portion 24 of the cup member is provided with downwardly sloping walls 24a. Disposed within the cup member is a body of liquid, preferably a column of mercury 27, the bottom walls 24a of the cup member being sloped as illustrated so that a minimum amount of mercury may be used to perform the desired sealing effect, as will hereinafter be described.

The aperture 21 in the partition wall 20 is provided with thread means for engaging the threaded end of a conduit or pipe 28 which extends downwardly into the body of mercury 27 so that the bottom portion 28a of the pipe is closed or sealed by the mercury. It will be noted that the conduit 28 is spaced from the walls 25 and bottom 24 of the cup member and the hollow stem portion 18 of the body forms a passageway or conduit 18a for freely connecting the pressure chamber 13 of the combined gas meter and pressure regulator with the second chamber 26 formed by the cup member 23.

According to this invention, the amount of mercury or liquid 27 positioned in the cup member is a predetermined amount sufficient to maintain and withstand the normal operating pressure within the pressure chamber 13 of the regulating device 10. However, in the event that the pressure within the pressure chamber 13 of the combined gas meter and pressure regulator should for any reason exceed a predetermined operating pressure of the device, as for example, the sticking of the valve in the open position, the excess pressure will vent through the conduit 18a and into the chamber 26 to force the liquid or mercury 27 to be displaced upwardly through the conduit 28, thereby allowing the excess pressure to be vented therethrough and into the atmosphere. When this occurs, the displaced mercury 27 is collected in the upper chamber 22. If desired, the bottom walls 22a of the upper chamber 22 may be downwardly sloped so as to facilitate the gravitation of the displaced liquid back through the conduit 28 and into the lower chamber 26 to automatically reseal the meter when the excess pressure has been relieved.

According to the present invention, the vent chamber 29 of the combined gas meter and pressure regulator may be vented through the blow-off attachment. This is accomplished by providing the upper chamber 22 of the body member with a bore 30 communicating with the passageway 31 formed in the vent cover portion of the housing so that the vent chamber 29 is in free communication with the atmosphere through the body member.

Thus it will be noted that with this arrangement the blow-off means directly and freely connects the pressure chamber 13 and vent chamber 29 of the combined gas meter and pressure regulator with the atmosphere.

Not only does this invention provide a simple and efficient blow-off means for a combined gas meter and regulator, but it has the further advantage that the construction enables the blow-off unit to be readily removed or repaired in the field without the necessity of disassembling or removing the combined gas meter and pressure regulator from the line. Also, the casting forming the blow-off means is relatively simple in construction and is positive in operation. If desired, this novel blow-off means may be readily attached to existing meters.

Variations and modifications may be made within the scope of the claim and portions of the improvements may be used without others.

I claim:

In combination with a gas meter having a housing provided with side walls forming a gas pressure chamber with one of said side walls having an opening therein, a detachable self-contained liquid sealing and vent unit, and means for securing said unit to said side wall to overlie and close said opening in the side wall and to vent said pressure chamber in response to excess pressure in said chamber, said unit comprising a body having an opening communicating with said opening in said side wall and aligned open-ended portions and forming an upper unit chamber having a downwardly sloping bottom wall with an aperture therein and opened to the atmosphere in one end thereof through one of said end portions, a cup member closing the other end portion of said body and forming therein a lower unit chamber, a body of liquid disposed in said cup member, and a conduit having one end in communication with the aperture in said sloping walls of said upper unit chamber and having its other end extending into said body of liquid and spaced from said cup member, said cup member having upwardly projecting walls surrounding said conduit in spaced relation thereto with the upper end of the chamber formed by the cup member in communication with said pressure chamber through said openings so that excess pressure within the pressure chamber will act on the liquid between said conduit and said upwardly projecting walls and force said body of liquid to be displaced allowing excess gas pressure to be vented through said conduit and into said upper unit chamber connected to the atmosphere and said sloping walls of said upper chamber allowing the displaced liquid to gravitate to its original position upon the relief of excess pressure within the said pressure device.

References Cited in the file of this patent

UNITED STATES PATENTS

| | | | |
|---|---|---|---|
| 845,749 | Bradley | Mar. 5, | 1907 |
| 893,521 | Kenton | July 14, | 1908 |
| 968,021 | Youngs | Aug. 23, | 1910 |
| 971,099 | Youngs | Sept. 27, | 1910 |
| 1,101,225 | Wolf | June 23, | 1914 |
| 1,187,667 | Smyley | June 20, | 1916 |
| 1,437,138 | Gray | Nov. 28, | 1922 |
| 1,674,625 | Pickering | June 19, | 1928 |
| 1,763,376 | Smith | June 10, | 1930 |
| 1,806,220 | Rockwell | May 19, | 1931 |
| 1,865,870 | MacLean et al. | July 5, | 1932 |
| 1,949,885 | Smith | Mar. 6, | 1934 |
| 2,274,697 | Hutchinson et al. | Mar. 3, | 1942 |